(12) United States Patent
Liang et al.

(10) Patent No.: US 6,407,793 B1
(45) Date of Patent: Jun. 18, 2002

(54) COLOR LIQUID CRYSTAL DISPLAY

(75) Inventors: Wei-Chen Liang; Pin Chang; Jung-Hsiang Tseng, all of Hsinchu; Pai-Chang Ho, Kaoshiung Hsien, all of (TW)

(73) Assignee: Giantplus Technology Co., Ltd., Miaoli Hsien (TW)

( * ) Notice: Subject to any disclaimer, the term of this patent is extended or adjusted under 35 U.S.C. 154(b) by 0 days.

(21) Appl. No.: 09/846,246

(22) Filed: May 2, 2001

(51) Int. Cl.[7] .................. G02F 1/1343; G02F 1/1335
(52) U.S. Cl. .............. 349/139; 349/106; 349/155
(58) Field of Search ................ 349/106, 149, 349/152, 139, 151, 155

(56) References Cited

U.S. PATENT DOCUMENTS 5,936,694 A * 8/1999 Suzuki et al. ............ 349/151
5,982,470 A * 11/1999 Nakahara et al. ......... 349/152
6,172,732 B1 * 1/2002 Hayakawa et al. ........ 349/152

\* cited by examiner

Primary Examiner—Toan Ton
(74) Attorney, Agent, or Firm—Rosenberg, Klein & Lee

(57) ABSTRACT

The present invention provides a color LCD, which comprises a first substrate and a second substrate with a liquid crystal layer sandwiched in between and a seal-ring for sealing them. The seal-ring has conductive spacers. Transparent electrode plates cover two opposed surfaces of the two substrates, respectively. The seal-ring having conductive spacers is used to conduct the two transparent electrode plates. A color filter is disposed between the first substrate and the transparent electrode plates. The color filter has a plurality of pixels disposed thereon. Each of the pixels comprises at least two sub pixels, and each of the sub pixels is composed of at least two colors. Conductive walking lines on the transparent electrode plates are used to electrically connect at least two data transmission lines of the same color in each column of longitudinally-arranged pixels to the same pin.

11 Claims, 7 Drawing Sheets

COLOR LIQUID CRYSTAL DISPLAY

FIELD OF THE INVENTION

The present invention relates to an improved structure of a liquid crystal display (LCD) and, more particularly, to a color LCD having better color mixing effect.

BACKGROUND OF THE INVENTION

Displays are the most direct sensory interfaces between humans and televisions and between humans and electronic/information products. The quality of a display directly influences the visual feel of the user or even the emotion of the user. They play the roles as output devices for showing pictures and texts. Because LCDs have the characteristics of thin shape, light weight, low power dissipation, they have been widely used as large displays such as screens of desktop computers and small displays such as portable information terminals. The utility rate of LCDs gradually increases.

In an LCD, the output of its color image is composed of a plurality of pixels on a color filter matched with a transparent electrode plate. An image is formed by pixels of different colors and brightness. As shown in FIG. 1, a color driving module 10 of a prior art LCD is composed of a plurality of tidily arranged pixels 12, wherein each pixel 12 is divided into three sub pixels 14, generally being the three primary colors of red (R), green (G), and blue (B). In the driving circuit, a set of data transmission lines (segment) 16 and a set of signal scan lines (common) 18 are provided for longitudinally-arranged sub pixels 14 and transversally-arranged pixels 12, respectively. Magnitudes of voltages of the driving circuit are exploited to individually control the color of each pixel 12. Through mixing the three primary colors of different brightness to form images, an LCD can accomplish the effect of full colors.

The above color displaying way can obtain better quality of image and color mixing effect for high-level and high-color displays such as displays having resolution higher than 160×160. However, the design of the driving circuit thereof is complex, and more driving parts are required. Therefore, the above color displaying way cannot apply to all products. For some LCDs of lower resolution, the above color displaying way will result in zigzagged or brick-shaped pictures, hence limiting the color mixing effect. Accordingly, the present invention aims to propose an improved structure of a color LCD to resolve the above problems.

SUMMARY OF THE INVENTION

The primary object of the present invention is to provide a color LCD, wherein each sub pixel of each pixel is divided into several portions, which are simultaneously controlled to obtain better color mixing effect and to achieve displaying effect commensurate with that of a high-level LCD.

Another object of the present invention is to provide a low-cost color display capable of displaying images of high quality so that zigzagged or brick-shaped pictures can be avoided.

Yet another object of the present invention is to provide a low-level color display, which can be manufactured using the original fabrication process and equipments.

To achieve the above objects, a color filter disposed in an LCD of the present invention has tidily arranged pixels. Each of the pixels comprises more than two sub pixels, each composed of two or three colors. A set of signal scan lines and a set of data transmission lines on a transparent electrode plate are electrically connected to transversely arranged colors and longitudinally arranged colors, respectively. Through the effects of conductive walking lines and conductive spacers on the transparent electrode plate, two or three data transmission lines of the same color in each column of longitudinally-arranged pixels can be electrically connected together and are then connected to the same pin.

The various objects and advantages of the present invention will be more readily understood from the following detailed description when read in conjunction with the appended drawings, in which:

BRIEF DESCRIPTION OF THE DRAWINGS

FIG. 4 is a partly enlarged view of FIG. 3, wherein FIG. 4(A) is a diagram showing walking lines of the transparent electrode plate, and FIG. 4(B) is a diagram showing the connection and arrangement of two sets of sub pixels;

FIG. 5 is another partly enlarged view of FIG. 3, wherein FIG. 5(A) is a diagram showing walking lines of the transparent electrode plate, and FIG. 5(B) is a diagram showing the connection and arrangement of three sets of sub pixels;

FIG. 7 is a partly enlarged view of FIG. 6, wherein FIG. 7(A) is a diagram showing walking lines of the transparent electrode plate, and FIG. 7(B) is a diagram showing the connection and arrangement of two sets of sub pixels;

DETAILED DESCRIPTION OF THE PREFERRED EMBODIMENTS

Figure 1:
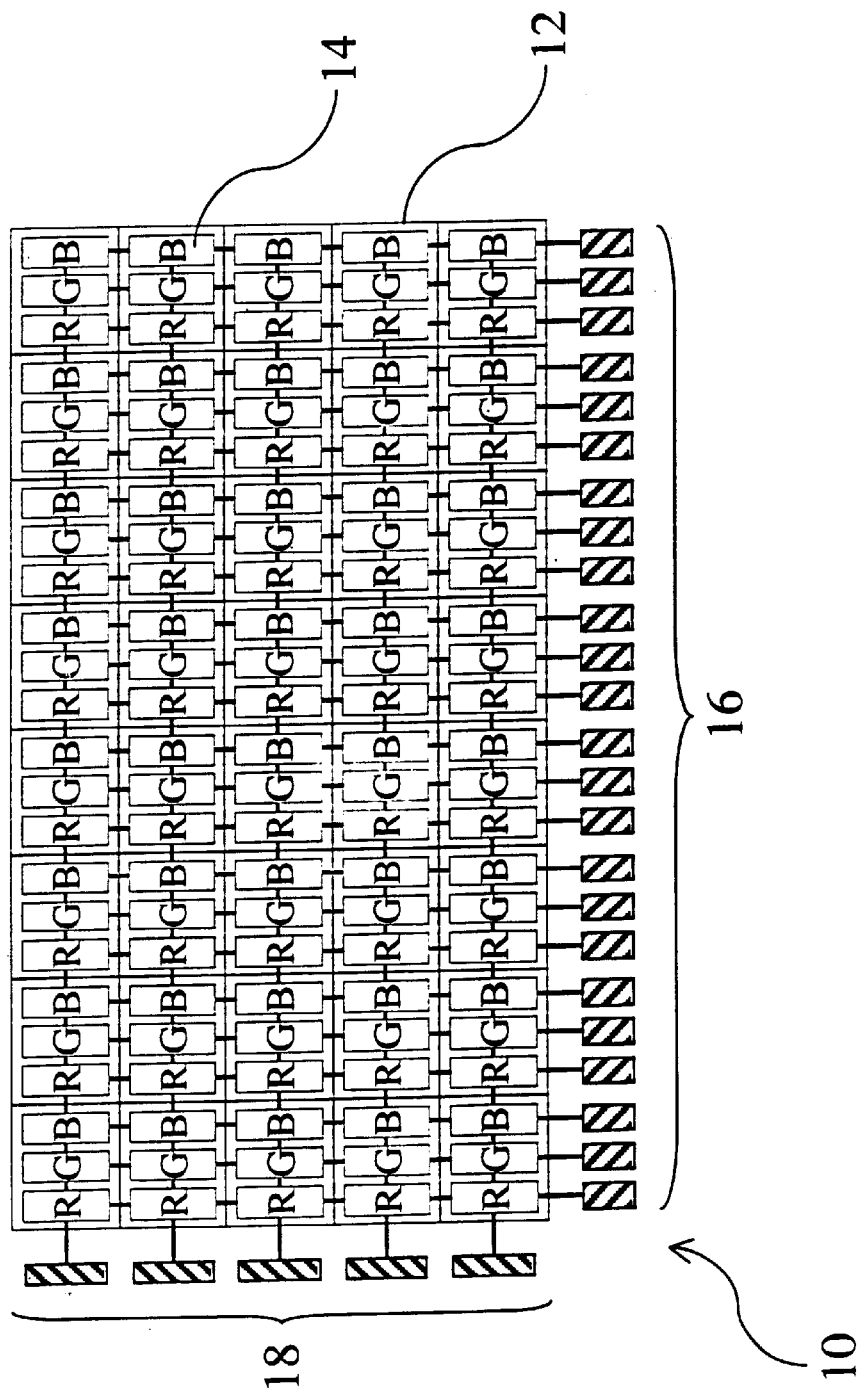
FIG. 1 is a diagram of a color driving module of a prior art LCD.
Figure 2:
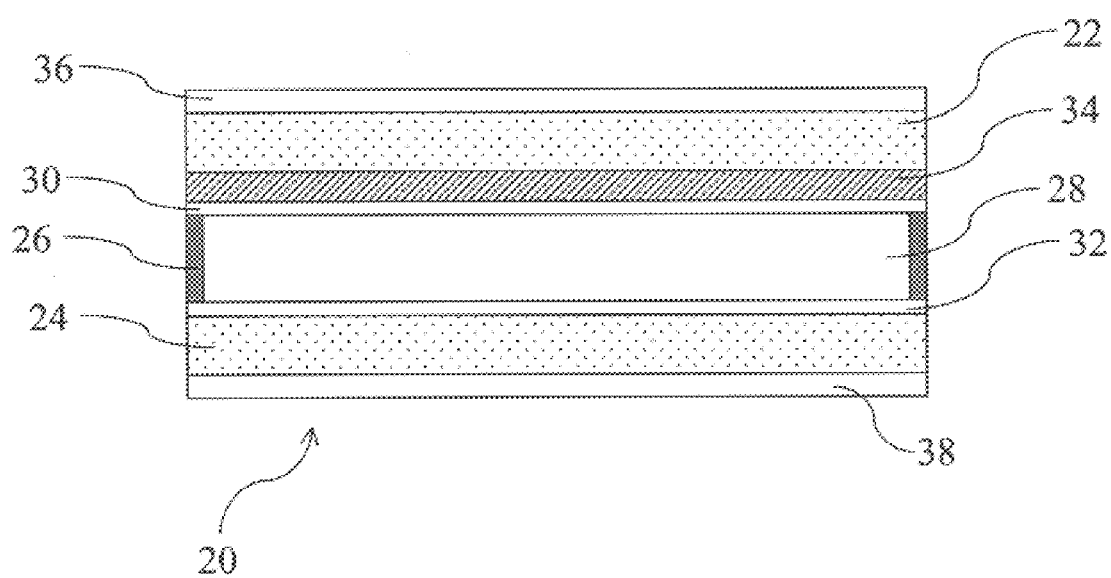
FIG. 2 is a cross-sectional view of a color LCD of the present invention.

As shown in FIG. 2, a color LCD 20 at least comprises a first substrate 22 and a second substrate 24. Generally, the two substrates 22 and 24 are transparent glass substrates or substrates made of other transparent materials. The two substrates 22 and 24 are parallel spaced. Each of the two substrates 22 and 24 has a surface opposed to each other. A seal-ring 26 surrounds the periphery between the first substrate 22 and the second substrate 24 to form a closed space between the two substrates 22 and 24 and the seal-ring 26. Liquid crystal material is filled into the closed space to form a liquid crystal layer 28. That is, the above liquid crystal layer 28 is sandwiched between the first and second substrates 22 and 24, and the seal-ring 26 seals and surrounds the periphery thereof The seal-ring 26 has conductive spacers, generally being Au spacers. Transparent electrode plates 30 and 32 comprising indio tin oxide (ITO) electrodes covers the opposed surfaces of the two substrates 22 and 24, respectively. The seal-ring 26 having conductive spacers is used to conduct the upper and lower transparent electrode plates 30 and 32. A color filter 34 is disposed between the first substrate 22 and the transparent electrode plate 30. The color filter has a plurality of tidily arranged pixels disposed thereon. Finally, an upper polarizer 36 and a lower polarizer 38 cover the outer surfaces of the first and second substrates 22 and 24, respectively. When a voltage signal is applied, the two transparent electrode plates 30 and 32 will match the function of the liquid crystal layer 28 to let it have light-penetrating effect and light-reflecting effect. In other words, the direction of arrangement of liquid crystal molecules in the liquid crystal layer 28 is controlled by electric field to change the light-penetrating ratio of the LCD 20 for displaying an image.

Figure 3:
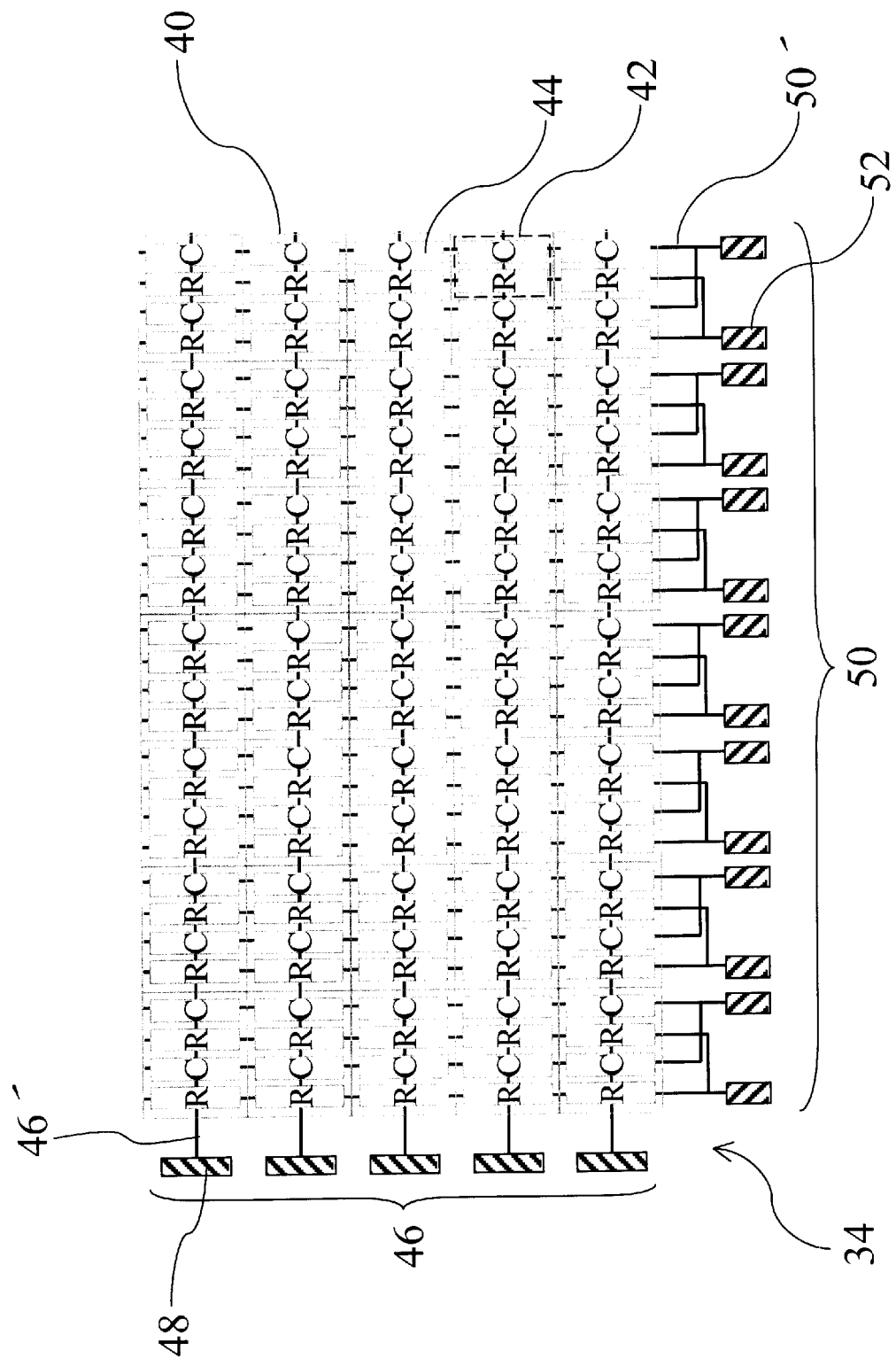
FIG. 3 is a diagram of a color filter having two colors according to an embodiment of the present invention.
Figure 4:
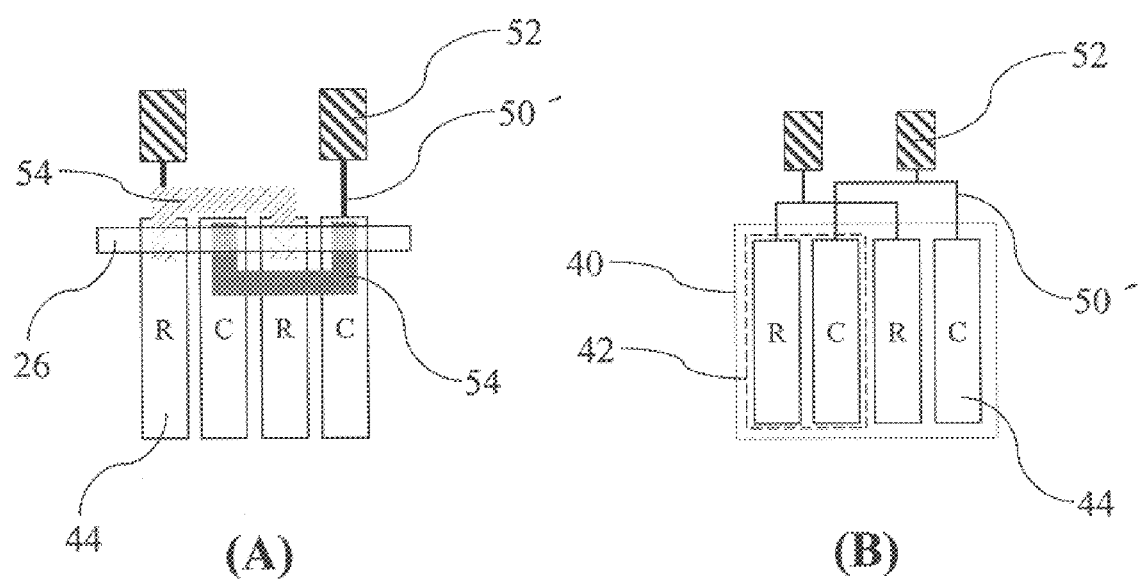

Each of the pixels on the above color filter 34 comprises more than two sub pixels, and each of the sub pixels is composed of two or three colors. The characteristics of the present invention will be illustrated below through various kinds of embodiments having different number of pixels and different composition of sub pixels. As shown in FIG. 3, the color filter 34 has a plurality of pixels 40, each having two sub pixels 42. Each of the sub pixels 42 is composed of two colors 44, being a primary color and its contrastive color, e.g., red (R) and cyan (C). A set of signal scan lines 46 on the transparent electrode plate 30 are electrically connected to each row of transversely-arranged sub pixels 42 so that each signal scan line (Common) 46' connects sub pixels 42 of the same row to a pin 48. Another set of data transmission lines 50 are electrically connected to each column of longitudinally-arranged colors 44 so that each data transmission line (Segment) 50' connect colors 44 of the same column together. Two data transmission lines 50' of the same color 44 in each column of longitudinally-arranged pixels 40 are electrically connected together so that the two data transmission lines 50' can be connected to the same pin 52. Please also refer to FIG. 4. The connection of two data transmission lines 50' of the same color in each column of longitudinally-arranged pixels 40 is accomplished by using the seal-ring 26 having conductive spacers to conduct the two transparent electrode plates 30 and 32 and by using reverse U-shaped conductive walking lines 54 on the transparent electrode plates 30 and 32 to connect two strips of the color so as to simultaneously control them.

Figure 5:
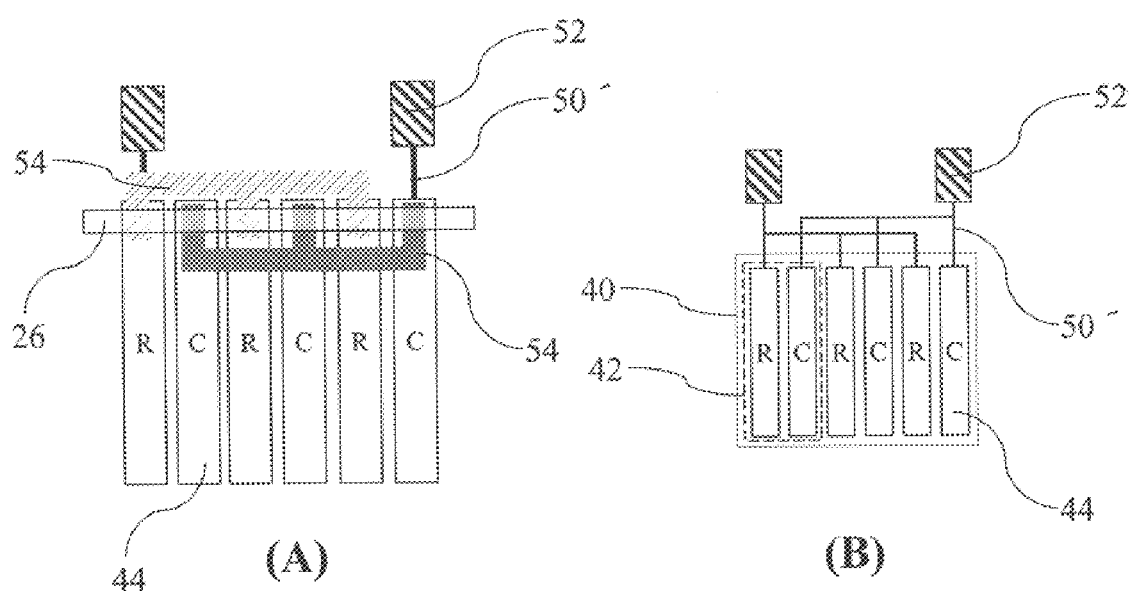

Additionally, if each of the pixels 40 on the above color filter 34 has three sub pixels 42, as shown in FIG. 5, and each of the sub pixels 42 is composed of two complementary colors 44, then three data transmission lines 50' of the same color in each column of longitudinally-arranged pixels 40 are connected to the same pin 52 by using the seal-ring 26 and the dual reverse U-shaped conductive walking lines 54. Other structures and effects are the same as above and thus will not be further described.

Figure 6:
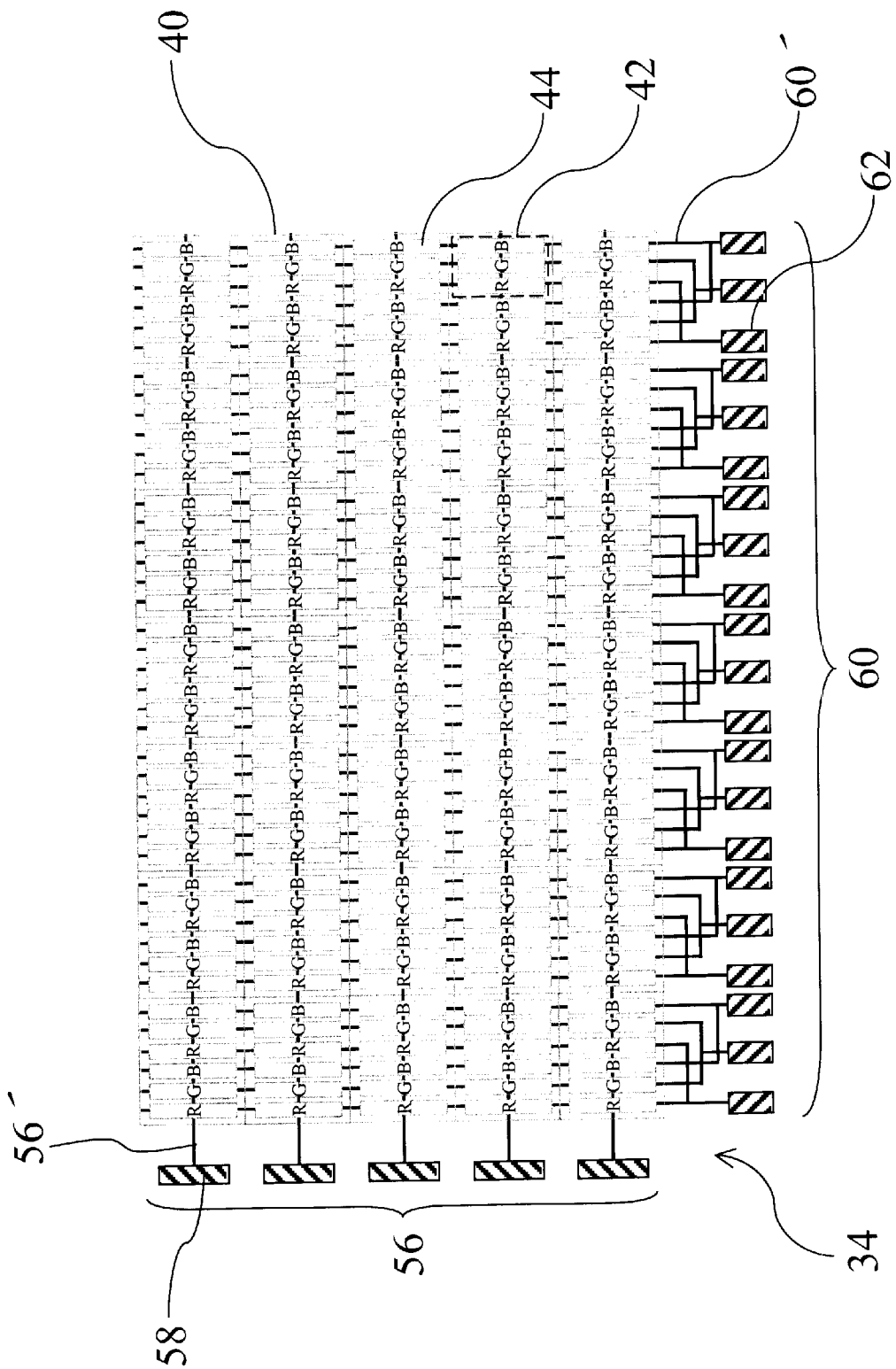
FIG. 6 is a diagram of a color filter having three colors according to another embodiment of the present invention.
Figure 7:
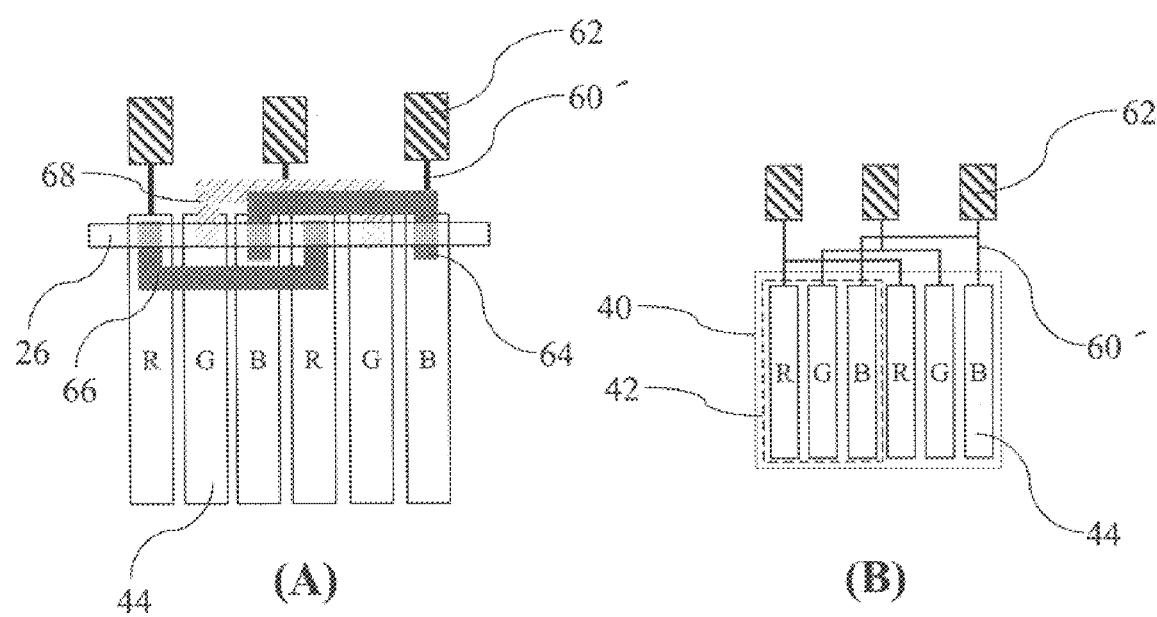

In addition to the embodiment wherein each of the sub pixels 42 of the color filter 34 has two colors 44, the present invention can also have other different embodiments. As shown in FIG. 6, each of the pixels 40 on the color filter 34 has two sub pixels 42, and each of the sub pixels 42 is composed of three colors 44, being the three primary colors of red (R), green (G), and blue (B). A set of signal scan lines 56 on the transparent electrode plate 30 are electrically connected to transversely-arranged sub pixels 42 so that each signal scan line 56' connects sub pixels 42 of the same row to the same pin 58. Another set of data transmission lines 60 are electrically connected to longitudinally-arranged colors 44 so that each data transmission line 60' connects colors 44 of the same column together. Two data transmission lines 60' of the same color 44 in each column of longitudinally-arranged pixels 40 are electrically connected together so that the two data transmission lines 60' can be connected to the same pin 62. Please also refer to FIG. 7. The connection of two data transmission lines 60' of the same color in each column of longitudinally-arranged pixels 40 is accomplished by using the seal-ring 26 having conductive spacers to conduct the two transparent electrode plates 30 and 32 and by using reverse U-shaped conductive walking lines 64 on the transparent electrode plate 30, reverse U-shaped conductive walking lines 66 on the transparent electrode plate 32, and original conductive walking lines 68 on the color filter 34 to connect two strips of the color so as to simultaneously control them.

Similarly, each of the pixels on the above color filter having three colors can have more than three sub pixels, and each of the sub pixels can be composed of the three primary colors. The connection and arrangement of the walking lines and the sub pixels of the transparent electrode plate are the same as above and thus will not be further described.

The pixels on the color filter used in the present invention can be designed to form a dot matrix or an irregular pattern, and the way of arrangement of the colors on the color filter can be designed to form a straight-line shape or an alterative rectangular grid shape.

To sum up, the present invention provides a color LCD, wherein each sub pixel of each pixel is divided into several portions, and walking lines of the same color are simultaneously controlled so as to have better color mixing effect. Thereby, displays having low number of large pixels at the resolution of 32×32, 48×48, or 64×64 will have color displaying effect commensurate with that of a high-level LCD. Moreover, characteristics of high quality of image and low cost can both be obtained, and zigzagged or brick-shaped pictures can be avoided. Additionally, the display of the present invention can be manufactured using the original fabrication process and equipments.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. A color liquid crystal display at least comprising:

a first substrate and a second substrate, said two substrates being parallel spaced, each of said two substrates having a surface opposed to each other; liquid crystal material sandwiched between said two substrates, a seal-ring being used to surround the periphery of said two substrates and to seal said liquid crystal material, said seal-ring having conductive spacers;

two transparent electrode plates respectively covering said opposed surfaces of said two substrates, said seal-ring having said conductive spacers being used to conduct said two transparent electrode plates; and a color filter disposed between said first substrate and said transparent electrode plates, said color filter having a plurality of tidily arranged pixels, each said pixel comprising at least two sub pixels, each said sub pixel being composed of at least two colors, a set of signal scan lines on said transparent electrode plates being electrically connected to transversely-arranged sub pixels, another set of data transmission lines being electrically connected to longitudinally-arranged colors, conductive walking lines on said transparent electrode plates being used to electrically connect at least two data transmission lines of the same color in each column of longitudinally-arranged pixels together so that said at least two data transmission lines can be connected to the same pin.

2. The color liquid crystal display as claimed in claim 1, wherein said first and second substrates are transparent glass substrates.

3. The color liquid crystal display as claimed in claim 1, wherein said sub pixel comprises a primary color and its contrastive color.

4. The color liquid crystal display as claimed in claim 1, wherein said sub pixel comprises the three primary colors of red, green, and blue.

5. The color liquid crystal display as claimed in claim 1, wherein said conductive spacers are Au spacers.

6. The color liquid crystal display as claimed in claim 1, wherein said transparent electrode plates comprise indio tin oxide electrodes.

7. The color liquid crystal display as claimed in claim 1, wherein the outer surfaces of said first and second substrates have polarizers.

8. The color liquid crystal display as claimed in claim 1, wherein said conductive walking lines on said transparent electrode plates form a reverse U-shaped structure.

9. The color liquid crystal display as claimed in claim 1, wherein said color filter is disposed between said first or second substrate and said transparent electrode plates.

10. The color liquid crystal display as claimed in claim 1, wherein said pixels on said color filter can be designed to form a dot-matrix or an irregular pattern.

11. The color liquid crystal display as claimed in claim 1, wherein the arrangement of colors on said color filter can be designed to form a straight-line shape of an alternative rectangular grid shape.

\* \* \* \* \*